(12) United States Patent
Potyrailo

(10) Patent No.: US 8,736,425 B2
(45) Date of Patent: May 27, 2014

(54) METHOD AND SYSTEM FOR PERFORMANCE ENHANCEMENT OF RESONANT SENSORS

(75) Inventor: Radislav Alexandrovich Potyrailo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 845 days.

(21) Appl. No.: 12/609,131

(22) Filed: Oct. 30, 2009

(65) Prior Publication Data

US 2011/0101996 A1 May 5, 2011

(51) Int. Cl.
*G08B 13/00* (2006.01)
*G01D 21/00* (2006.01)

(52) U.S. Cl.
USPC ...... 340/10.3; 340/10.1; 340/572.1; 324/655; 324/71.1

(58) Field of Classification Search
CPC ..... G08B 13/00; G08B 13/2417; G01D 21/00
USPC .............. 340/10.3, 10.1, 10.41, 572.1, 572.4, 340/572.7, 870.16; 73/24; 324/347, 633; 436/169; 257/440
See application file for complete search history.

(56) References Cited

U.S. PATENT DOCUMENTS

| 5,795,993 | A  | * | 8/1998  | Pfeifer et al. ............... 73/24.01 |
| 6,278,379 | B1 | * | 8/2001  | Allen et al. ............. 340/870.16  |
| 7,038,470 | B1 |   | 5/2006  | Johnson                                 |
| 7,297,112 | B2 |   | 11/2007 | Zhou et al.                             |
| 7,394,381 | B2 |   | 7/2008  | Hanson et al.                           |
| 7,551,058 | B1 |   | 6/2009  | Johnson et al.                          |
| 7,570,169 | B2 |   | 8/2009  | Li et al.                               |
| 2003/0109056 | A1 | * | 6/2003  | Vossmeyer et al. ........... 436/169  |
| 2006/0070451 | A1 |   | 4/2006  | Walsh et al.                          |
| 2006/0244568 | A1 |   | 11/2006 | Tong et al.                           |
| 2006/0244606 | A1 | * | 11/2006 | Li et al. ..................... 340/572.7 |
| 2007/0024410 | A1 |   | 2/2007  | Yazdi                                  |
| 2007/0038054 | A1 | * | 2/2007  | Zhou et al. .................... 600/347 |
| 2007/0090926 | A1 |   | 4/2007  | Potyrailo et al.                      |
| 2007/0090927 | A1 |   | 4/2007  | Potyrailo et al.                      |
| 2009/0152664 | A1 | * | 6/2009  | Klem et al. .................... 257/440 |

OTHER PUBLICATIONS

Co-pending US Patent Application entitled "Methods and Systems for Calibration of RFID Sensors", U.S. Appl. No. 12/118,950, filed May 12, 2008.
Birdsell et al., "Wireless Chemical Sensors for High Temperature Environments", Solid-State Sensors, Actuators, and Microsystems Workshop, Hilton Head Island, South Carolina, pp. 212-215, Jun. 4-8, 2006.
Joo et al., "Chemical Sensors With Integrated Electronics", Chem. Rev., vol. 108, pp. 638-651, 2008.
Potyrailo et al., "Multianalyte Chemical Identification and Quantitation Using a Single Radio Frequency Identification Sensor", Anal. Chem., vol. 79, pp. 45-51, 2007.

(Continued)

*Primary Examiner* — Edwin Holloway, III
(74) *Attorney, Agent, or Firm* — Jenifer E. Haeckl

(57) ABSTRACT

The present invention related to methods and systems for simultaneously sensing two or more environmental parameters of a sample. Included is an inductor-capacitor-resistor (LCR) resonator sensor and a pick up coil in operative association with the LCR resonator sensor wherein viscoelastic changes in the sensing film cause displacement of the antenna relative to the pick up coil.

22 Claims, 11 Drawing Sheets

(56) References Cited

OTHER PUBLICATIONS

Potyrailo et al., "Position-Independent Chemical Quantitation With Passive 13.56-MHz Radio Frequency Identification (RFID) Sensors", Talanta, vol. 75, pp. 624-628, 2008.

Hagleitner et al. "Smart Single-Chip Gas Sensor Microsystem", Letters to Nature, vol. 414, pp. 293-296, Nov. 15, 2001.

Lavrik et al., "Cantilever Transducers as a Platform for Chemical and Biological Sensors", Review of Scientific Instruments, vol. 75, No. 7, pp. 2229-2253, Jul. 2004.

Harpster et al., "A Passive Humidity Monitoring System for In Situ Remote Wireless Testing of Micropackages", Journal of Microelectromechanical Systems, vol. 11, No. 1, pp. 61-67, Feb. 2002.

Ong et al., "Design and Application of a Wireless, Passive, Resonant-Circuit Environmental Monitoring Sensor", Sensors and Actuators A, vol. 93, pp. 33-43, 2001.

Potyrailo et al., "Fluorescence Spectroscopy and Multivariate Spectral Descriptor Analysis for High-Throughput Multiparameter Optimization of Polymerization Conditions of Combinatorial 96-Microreactor Arrays", J. Comb. Chem., vol. 5, pp. 8-17, 2003.

Baard, "RFID Gussied Up With Biosensors", Wired News, 1 page, Aug. 26, 2003.

Li et al., "Integrated MEMS/NEMS Resonant Cantilevers for Ultrasensitive Biological Detection", Journal of Sensors, vol. 2009, Article ID 637874, pp. 1-10, 2009.

Nomura et al., Functional Passive Sensor System Using Reflective SAW Delay Line, Mater. Res. Soc. Symp. Proc., vol. 888, pp. 0888-V10-01.1-0888-V10-01.12, 2006.

Ikemoto et al., "Force Sensor System for Structural Health Monitoring Using Passive RFID Tags for Structural Health Monitoring", Portable Information Devices, 2008 and the 2008 7th IEEE Conference on Polymers and Adhesives in Microelectronics and Photonics, pp. 1-6, Aug. 2008.

PCT/SE2010/051160 Search Report, Feb. 8, 2011.

PCT/SE2010/051160 Written Opinion, Feb. 8, 2011.

S.R. Munnangi et al., CMOS Capacitive Pressure Sensor Design and Integration with RFID Tag for Biomedical Applications, Tencon 2008 IEEE Region 10 Conference, Nov. 19-21, 2008.

\* cited by examiner

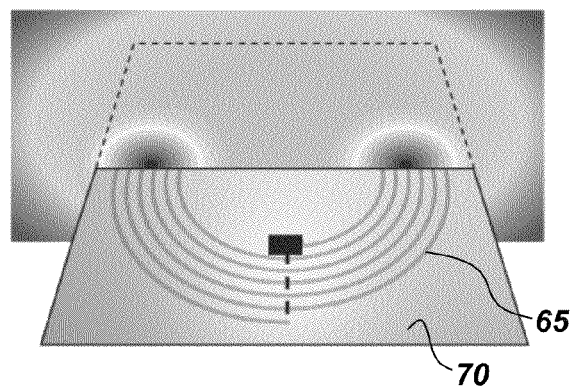
*Fig. 4*
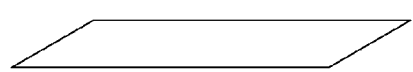
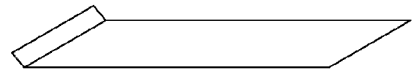
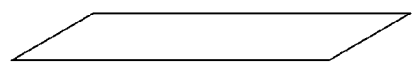
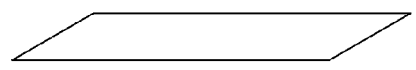
*Fig. 6A*  *Fig. 6B*
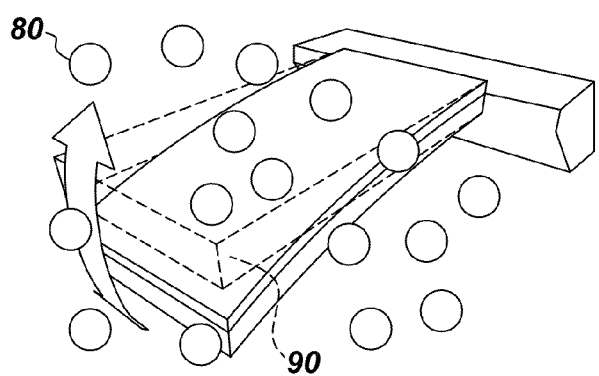
*Fig. 7*

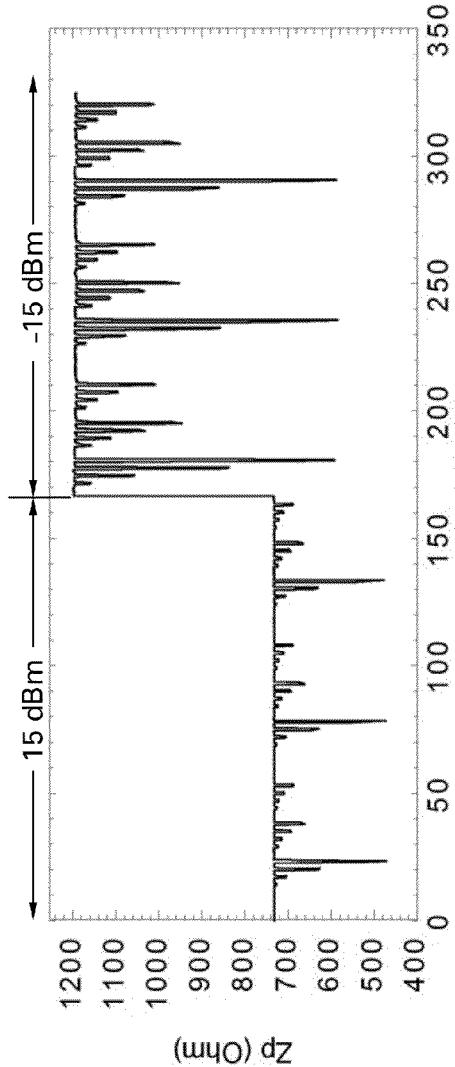
*Fig. 13A*
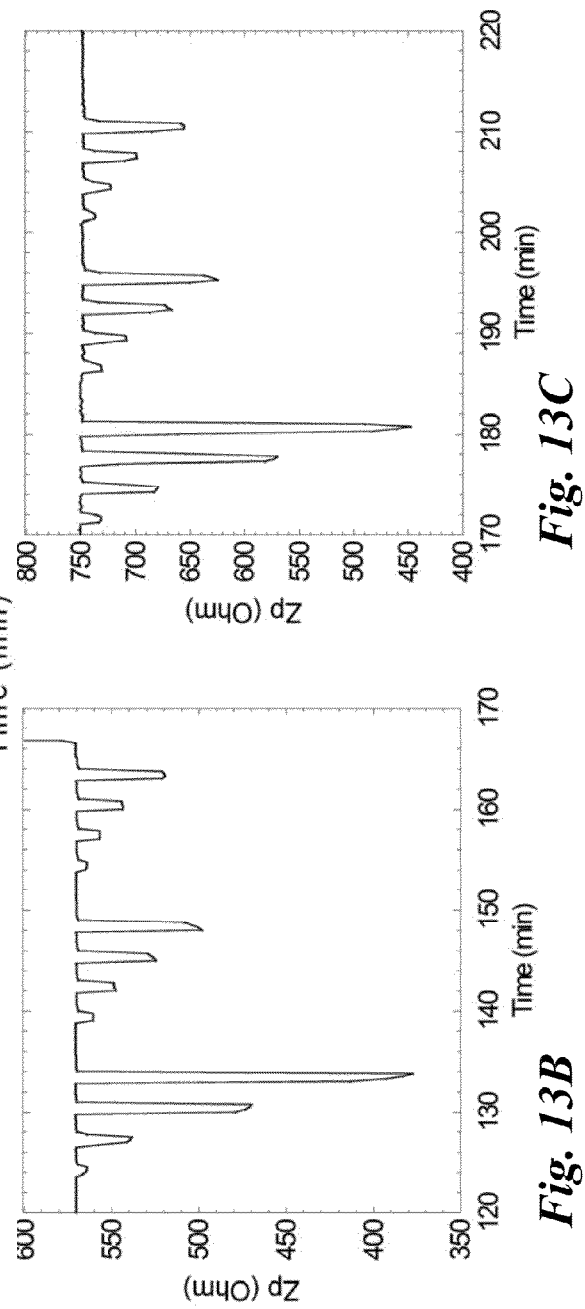
*Fig. 13C*
*Fig. 13B*

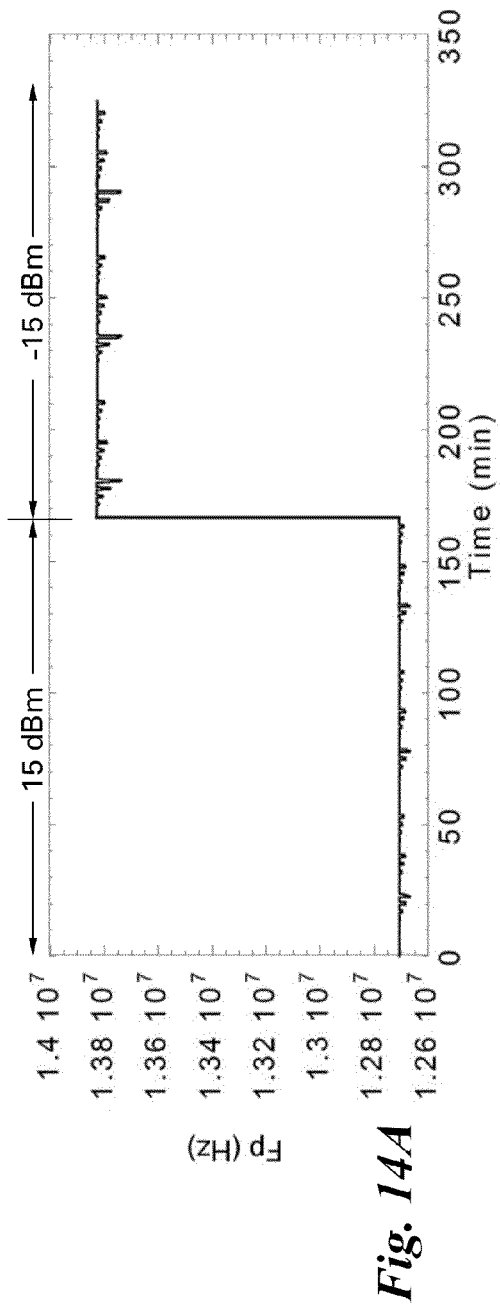
Fig. 14A
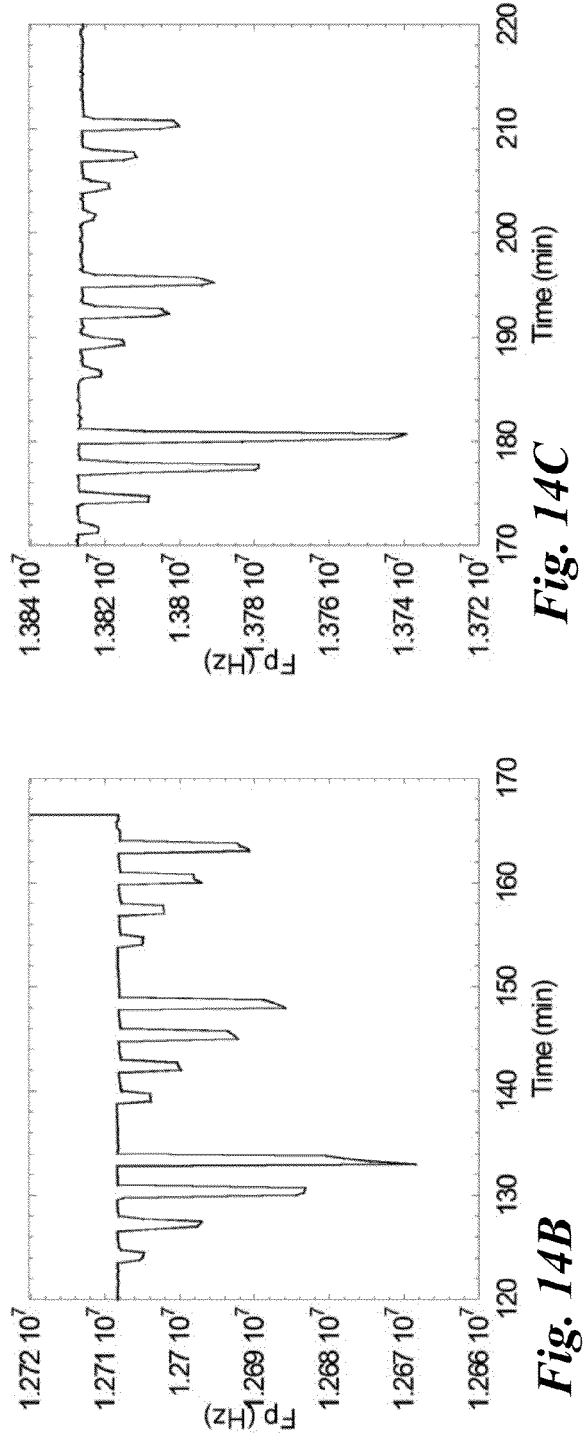
Fig. 14B
Fig. 14C

METHOD AND SYSTEM FOR PERFORMANCE ENHANCEMENT OF RESONANT SENSORS

BACKGROUND

The invention relates to radio-frequency identification (RFID) sensing devices, and more particularly to inductor-capacitor-resistor (LCR) sensing devices having enhanced selectivity and sensitivity.

Selectivity of sensors is one of critical aspects in sensor performance and applications. Typically, lack of selectivity prevents the wide use of sensors in sensing chemical and biological species in liquids and air for industrial and other applications. Two known approaches to address this problem include (1) developing very selective sensing films and (2) combining individual diverse sensors into an array. Unfortunately, each approach suffers from its own limitations. Highly selective sensing films typically have relatively slow recovery times due to strong vapor-material interactions. Combining sensors into an array could have manufacturing challenges.

Chemical and biological detection has been accomplished using RFID sensors. In this approach, ubiquitous and cost-effective passive RFID tags with integrated circuit read/write memory chips operating, for example at 13.56 MHz, may be adapted for chemical sensing. By applying a sensing film onto the resonant antenna of the RFID sensor and measuring the complex impedance of the RFID resonant antenna it is possible to correlate impedance response to chemical properties of interest. The digital data may also written into and read from the integrated circuit (IC) memory chip of the RFID sensor. This IC memory chip may store a unique digital ID, sensor calibrations, and information about the object onto which the sensor is attached.

Sensor response originates from changes in dielectric properties of the sensing film deposited onto a sensor. While RFID sensors can detect individual chemical and physical changes based on changes in dielectric properties, the selectivity of these sensors may be improved further if other modes of detection are identified.

Therefore, it would be desirable to provide sensor assembly with additional modes of sensing.

BRIEF DESCRIPTION

This invention is adapted to provide a sensor assembly capable of simultaneously sensing two or more environmental parameters of a sample.

One embodiment of the assembly comprises: an inductor-capacitor-resistor (LCR) resonator sensor and a pick up coil in operative association with the LCR resonator sensor. The LCR resonator sensor comprises an antenna having a sensing region, a sensing film deposited onto the sensing region, and an attachment point for mechanically attaching the LCR resonator sensor to the assembly. In operation, viscoelastic changes in the sensing film cause displacement of the antenna relative to the pick up coil.

In a second embodiment, a method for measuring two or more environmental conditions of a sample is provided. The method comprises: providing an LCR assembly; transmitting an electromagnetic signal from the LCR resonator sensor; sensing the LCR resonator sensor signal with the pick-up coil; and reading the LCR resonator sensor signal using a reader/writer device coupled to the pick-up coil.

In a third embodiment a method of measuring two or more conditions of an environment comprises using an LCR assembly wherein the LCR resonator has a IC memory chip attached to the antenna. The method involves applying different input power levels to the IC memory chip, and measuring complex impedance spectrum of the sensing antenna at the different input power levels. Changes in the complex impedance spectrum at the different power levels relate to different physical or biological properties of the sample.

Also provided is a method of correcting for at least one noise parameter of an LCR resonant sensor response comprising the steps of: providing an LCR assembly; measuring the complex impedance of the LCR resonator sensor upon exposure to an environmental condition; and correcting for the noise parameters using inputs of the LCR sensor.

DRAWINGS

These and other features, aspects, and advantages of the present invention will become better understood when the following detailed description is read with reference to the accompanying drawings in which like characters represent like parts throughout the drawings.

FIG. 4 is a non-limiting example of the operation of the disclosed sensor.

FIG. 6 is an illustration of methods used in measuring LCR sensor response: (A) known approach for measurements of LCR sensor response where a sensor is positioned at a certain distance from a pick up coil, and (B) non-limiting embodiment of the present invention, where the LCR sensor also serves as a cantilever and the LCR sensor signal is measured with a pick up coil.

FIG. 7 is a depiction of the general principle of cantilever operations used for sensor detection (prior art).

FIG. 13 illustrates 4 response of LCR sensor at two interrogation powers of +15 dBm and −15 dBm upon measurements of water, methanol, and ethanol vapors.

FIG. 14 illustrates $F_p$ response of LCR sensor at two interrogation powers of +15 dBm and −15 dBm upon measurements of water, methanol, and ethanol vapors.

DETAILED DESCRIPTION

Figure 1:
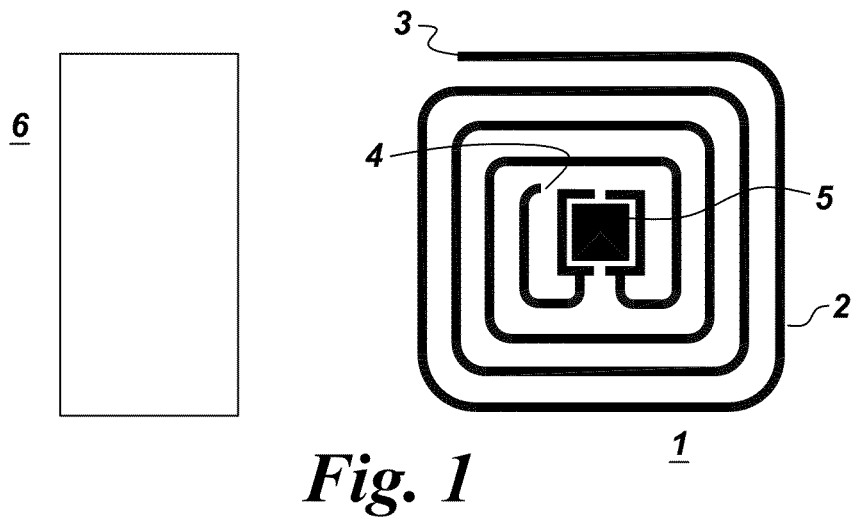
FIG. 1 is a schematic representation of an LCR sensor having an IC memory chip, an antenna, and a pick up coil.

The invention is related to an LCR assembly for simultaneous sensing of two or more environmental parameters of a sample. As used herein an LCR assembly is comprised of an LCR sensor, which uses an LCR resonant circuit and a pick up coil. An LCR sensor with an IC memory chip may also be referred to as an RFID sensor.

Sensor response originating from the changes in dielectric properties of a sensing film deposited onto a RFID sensor is known. Such an approach is limited as it is applicability only to sensing films that change their dielectric properties. In contrast, enhanced selectivity may be achieved when the RFID configured to respond as a cantilever where viscoelastic changes of the sensing film result in the generation of the stress in the sensing film. The stress may result in the bending of the cantilever sensor in relation to a corresponding pick up coil. The resulting sensor selectivity may be measured and quantified using multivariate analysis (principal components analysis, PCA) as the increase of the contribution of the second principal component in sensor response.

In certain embodiments, such stress may cause the cantilever to deflect as a function of a specific environmental condition such as an analyte concentration. At the same time, other changes in the environment may result in changes in the dielectric properties of the sensing film while causing small or no changes in the bending of the cantilever. Thus, measuring changes in both dielectric properties and bending of the cantilever may allow for simultaneous sensing of two or more environmental parameters.

In certain embodiments the RFID sensor is an LCR sensor and is capable of responding as a cantilever as well as to changes in dielectric property. A change in dielectric property is measured by measuring the resonance response of the LCR sensor. As such, the LCR sensor may be used for sensing one or more conditions of a sample. Conditions may comprise a physical condition, a biological condition, or a chemical condition and may include a quantitative response for a desired parameter. For example, the sensor may be employed to monitor magnitude of an environmental parameter of interest such as, but not limited to, conductivity measurement, pH level, temperature, blood relevant measurement, ionic measurement, non-ionic measurement, non-conductivity measurement, electromagnetic radiation level measurement, pressure, vapor concentration, biological material concentration, and other types of measurements that may be taken from a typical fluid (solution or gas).

In certain embodiments, the sample may be a container such as a disposable container, bioreactor, a stainless steel container, a plastic container, a polymeric material container, or a pre-sterilized polymeric material container. Further, the container may be of different size and shape, for example, micro fluidic channel, a Petri dish, a glove box, a hood, or a plastic bag. A sample can be also an open volume such as an indoor enclosure or an outdoor monitoring station. Several samples can constitute the whole volume of a container.

The container may or may not have a predetermined shape. In certain embodiments, the container is a disposable bioprocess component. Non-limiting examples of the bioprocess component include a disposable storage bag, a disposable container, a product transfer line, a filter, a connector, a valve, a pump, a bioreactor, a separation column, a mixer, or a centrifugation system. In one example, the disposable container or bag may be made of plastic. The disposable container may comprise ports for inserting the LCR resonant sensor and the pick-up coil. In one embodiment, the sensor and the pick-up coil may be inserted in the container using the same port. In other embodiment, the sensor and the pick-up coil may be inserted in the container using separate ports. For example, the sensor may be used in conjunction with disposable bioprocess components to monitor the parameters inside the components during or after the operation.

In certain embodiments, the LCR sensor functions by providing a sensor readout that relies on the coupling between the LCR sensor and a corresponding pick up coil. The coupling between the LCR sensor and the pick up coil changes as a function of stress applied by a sensing film to the LCR sensor configured as a cantilever.

FIG. 1 illustrates a typical configuration of an LCR sensor (1) and a pick-up coil (6). The LCR sensor may include an antenna (2), an IC memory chip (5), and a sensing film deposited onto at least a portion of the antenna (not shown). The ends on the antenna (3 and 4) are electrically connected using a conductor medium, such as a conductor wire, a conductor strip, or a conductor cable. The connection between the antenna and the conductor medium is such that the conductor medium does not electrically shorten the other regions of the antenna that it crosses. The IC memory chip 5 is used for storing information and may be activated by the radio frequency signal transmitted from a read/write unit (not shown). The antenna 2 of the sensor 1 receives and transmits signals. The pick-up coil 6 of the read/write unit, which then sends the signals out of the sensing device, picks up the signals transmitted by the antenna 2. The sensor 1 and the pick-up coil 6 are placed in operative proximity. In one example, the sensor 1 and the pick-up coil 6 may be coupled via inductive coupling. In a preferred embodiment, the sensor 1 and the pick-up coil 6 may be adapted to communicate wirelessly.

Figure 2:
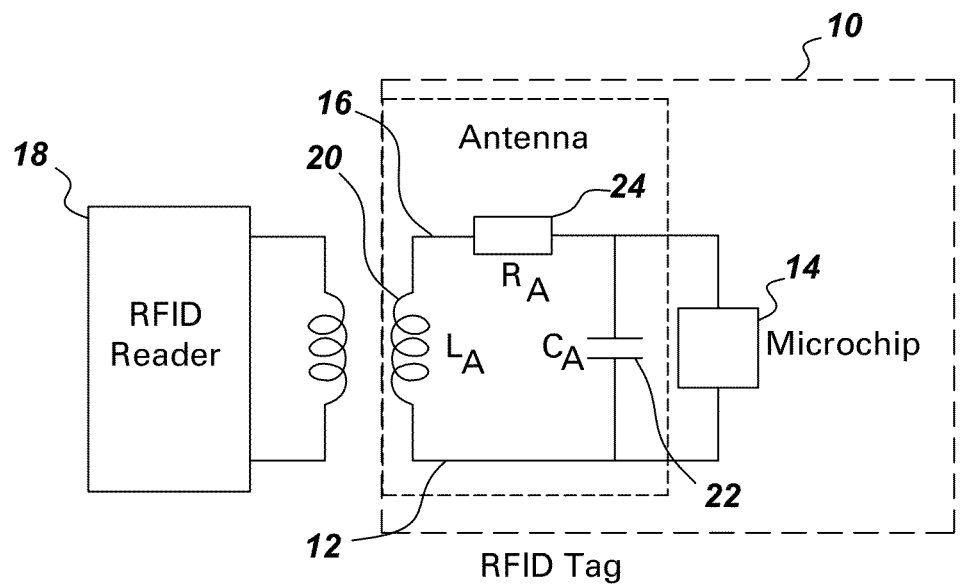
FIG. 2 is a schematic electrical diagram of an embodiment of the system of the invention showing an LCR sensor, an IC memory chip and a reader with its pick up coil.

FIG. 2 is a schematic electrical diagram of an embodiment of the system of the invention showing an LCR sensor assembly. As shown the assembly comprises an LCR sensor, an IC memory chip, and a reader with its pick up coil. An LCR sensor, which uses an LCR resonant circuit and an IC memory chip, may also be referred to as an RFID sensor. In certain embodiments, an IC memory chip is not required and an LCR sensor can also operate without the IC memory chip.

As shown, in FIG. 2 an RFID tag 10 transmits data and energy with the help of magnetically coupled resonance circuit 12. A passive RFID tag does not need a battery for its function and includes a memory chip 14, which in FIG. 2 is referred to as a microchip. The memory chip 14 is connected to an antenna. The chip 14 is read by an RFID reader 18 by illuminating the antenna 16 tuned by a combination of an inductor 20 having an antenna inductance ($L_A$), a capacitor 22 having an antenna capacitance ($C_A$), and a resistor 24 having an antenna resistance ($R_A$). The combination of an inductor of inductance L, a capacitor of capacitance C, and a resistor of resistance R is termed an LCR resonant circuit.

In certain embodiments, tuning of the LCR sensor may be done during the fabrication of the LCR sensing antenna. When the RF field passes through an antenna coil, an AC voltage is generated across the coil. This voltage is rectified in the chip 14 to result in a DC voltage for the chip operation. The chip 14 becomes functional when the DC voltage reaches a predetermined level needed to activate and operate the IC memory chip. This is also referred to as operational power level for the purpose of this application. By detecting the RF signal backscattered from the IC memory chip, the information stored in the IC memory chip can be fully identified. The distance between the passive tag 10 and the reader 18 is governed by the design parameters that include operating frequency, RF power level, reader's receiving sensitivity, size of antenna, data rate, communication protocol, and IC memory chip power requirements.

Figure 3:
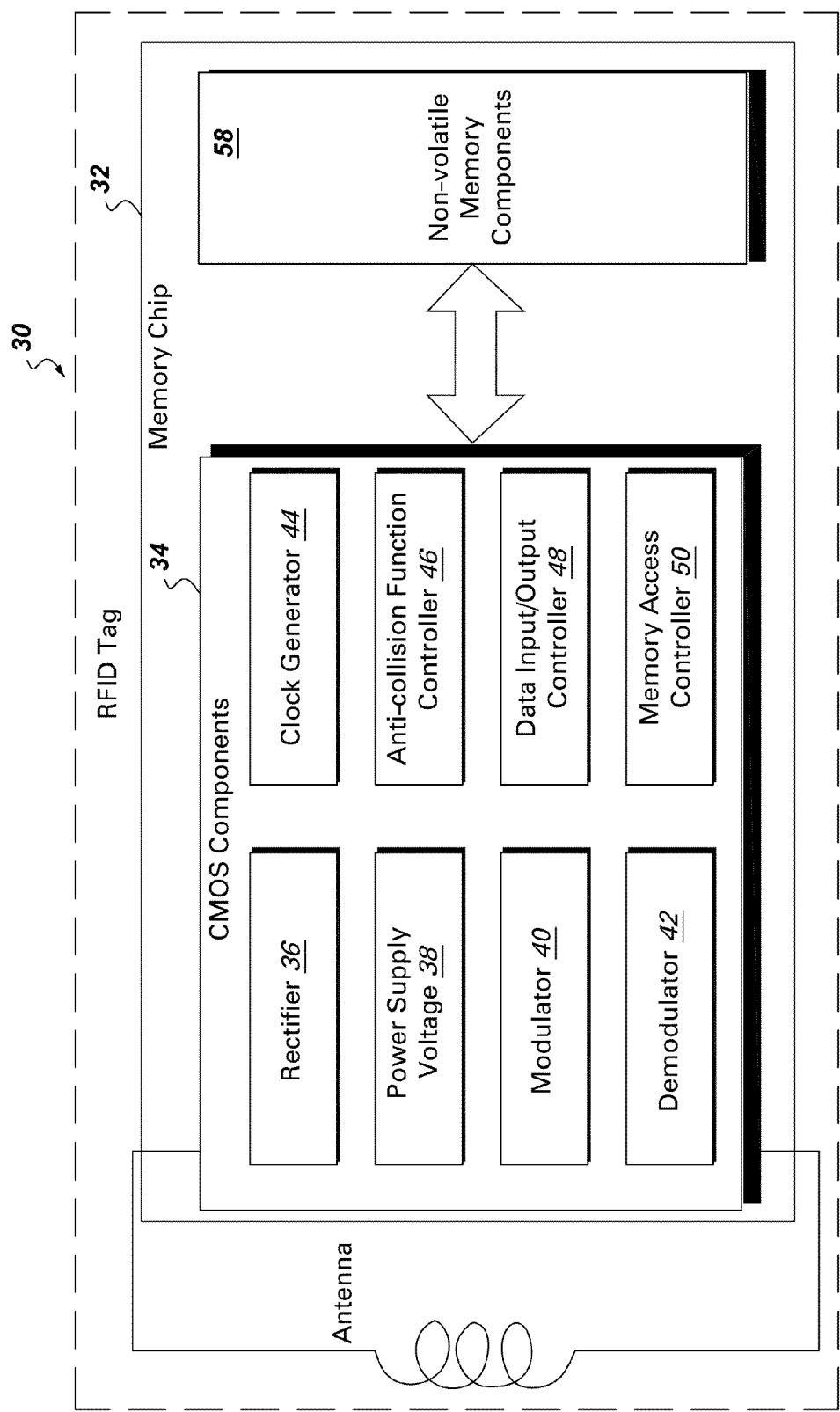
FIG. 3 is a schematic diagram of an embodiment of the system of the invention showing of an RFID tag and an IC memory chip for use in an LCR sensor.

One embodiment of an LCR sensor configuration is illustrated in FIG. 3 and includes an RFID sensor 30 comprising an IC memory chip 32. The IC memory chip 32 is an IC device. The IC memory chip 32 includes RF signal modulation circuitry 34, fabricated using a complementary metal-oxide semiconductor (CMOS) process and non-volatile memory components 58. The CMOS chip 34 includes several sub-components, such as a rectifier 36, a power supply voltage controller 38, a modulator 40, a demodulator 42, a clock generator 44, an anti-collision function controller 46, a data input/output controller 48, and a memory access controller 50. Nonlimiting examples of memory are non-volatile memory types such as Electrically Erasable Programmable Read-Only Memory (EEPROM) and Ferroelectric Random Memory (FRAM).

To activate the chip, an RFID interrogator (reader/writer device) sends an RF signal that is captured by the antenna of the RFID tag creating an AC voltage across the antenna. An on-chip rectifier further converts this AC voltage into a DC voltage that activates the IC chip. The activated chip is capable of sending stored information back to the RFID interrogator and is capable of receiving new information to be stored into its memory. The RFID interrogator uses command pulses to communicate with the chip for reading and writing data. Additionally, a comparator unit may be used to compare a current value of range of activation power levels with that of the predetermined range of power levels. A processing unit may also be employed to adjust one or more of a signal offset, a signal drift, a signal noise, and a slope of a sensor response.

In an LCR sensor, sensing response is provided from analyte-dependent change in circuit capacitance C, analyte-dependent change in circuit resistance R or a combination of the two. Analyte refers to the substance or condition being analyzed. The combination of changes in C and R is measured by measuring frequency response spectrum of the LCR resonant sensing circuit.

During sensor operations, LCR sensor response may be affected by both signal noise and signal drift. More specifically signal noise can be attributed to various environmental parameters such as ambient temperature, dielectric properties of the ambient environment, ambient humidity, proximity of the sensor to metals, surface contamination of sensor, and surface contamination of pick up coil. Signal drift can be attributed to a number of factors including surface contamination of the sensor or pick up coil, aging of the sensor components such as the sensing film, sensor substrate, antenna, and delamination of the sensing film from the substrate.

The origin of response of an LCR sensor to environmental parameters of interest is schematically described in FIG. 4, an electromagnetic field is generated in the sensor antenna (65) upon reading and extends out from the plane of the sensor. The electromagnetic field can be affected by the dielectric property of an ambient environment providing the opportunity for measurements of physical parameters. The LCR sensor may be read wirelessly with a pickup coil or, in an alternative embodiment, by attaching a wire directly to a frequency spectrum measurement device such as a network analyzer.

Measurements of conducting species (liquids or solids) can be performed using a protecting layer that separates the conducting medium from the LCR sensor antenna. For measurements in highly conducting media, a protective layer on the sensor antenna may be used to prevent electrical shortening and loss of the sensor resonance. Response of the LCR sensor to chemical or biological parameters involves changes in the dielectric and dimensional properties of sensing film deposited onto the resonant antenna of the LCR sensor. These changes are related to the analyzed environment that interacts with the sensing film (70).

A sensing film (70) is selected for the proper chemical or biological recognition based on the analyte and sensing material properties. The analyte-induced changes in the sensing film affect the complex impedance of the antenna circuit through the changes in material resistance and capacitance between the antenna turns. Such changes provide diversity is response of an individual RFID sensor and provide the opportunity to replace a whole array of conventional sensors with a single LCR or RFID sensor.

Figure 5:
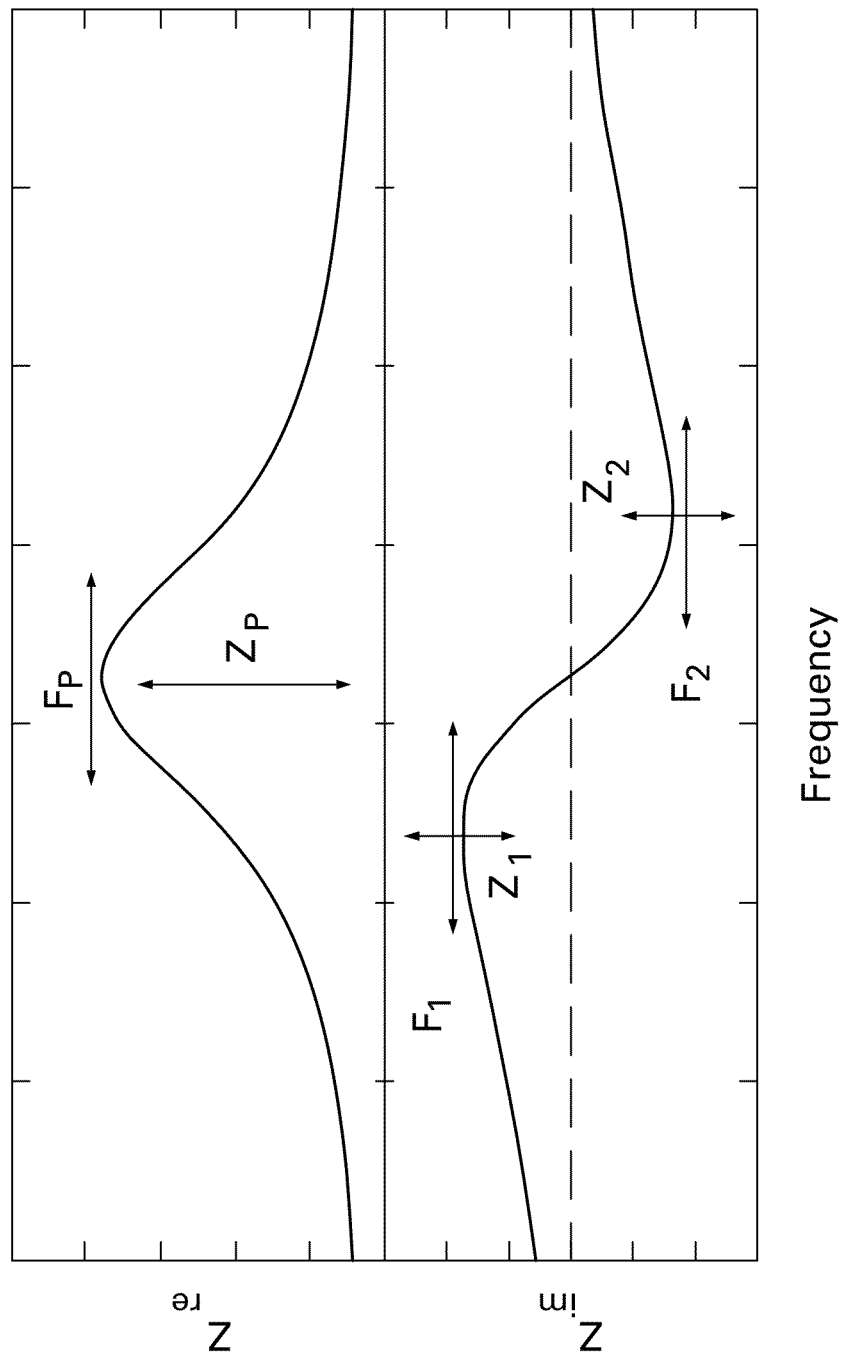
FIG. 5 is an example of a measured complex impedance spectrum used for multivariate analysis.

For selective analyte quantitation using individual LCR sensors, complex impedance spectra of the sensor antenna are measured as shown in FIG. 5. Non-limiting examples of LCR resonant circuit parameters include impedance spectrum, real part of the impedance spectrum, imaginary part of the impedance spectrum, both real and imaginary parts of the impedance spectrum, frequency of the maximum of the real part of the complex impedance ($F_p$), magnitude of the real part of the complex impedance ($Z_p$), resonant frequency ($F_1$) and its magnitude ($Z_1$) of the imaginary part of the complex impedance, and anti-resonant frequency ($F_2$) and its magnitude ($Z_2$) of the imaginary part of the complex impedance.

Additional non-limiting examples of the LCR resonant circuit parameters include parameters that can be extracted from the response of the equivalent circuit of the LCR sensor. These additional parameters may include quality factor of resonance, zero-reactance frequency, phase angle, and magnitude of impedance of the resonance circuit response of the LCR sensor. Applied multivariate analysis reduces the dimensionality of the multi-variable LCR sensor response to a single data point in multidimensional space for selective quantitation of different environmental parameters of interest. Non-limiting examples of multivariate analysis tools are canonical correlation analysis, regression analysis, nonlinear regression analysis, principal components analysis, discriminate function analysis, multidimensional scaling, linear discriminate analysis, logistic regression, and/or neural network analysis. By applying multivariate analysis of the full complex impedance spectra or the calculated parameters, quantitation of analytes and their mixtures with interferences is performed with individual LCR sensors. Besides measurements of the complex impedance spectra parameters, it is possible to measure other spectral parameters, related to the complex impedance spectra. Examples include, but are not limited to, S-parameters (scattering parameters) and Y-parameters (admittance parameters).

FIG. 6A illustrates a known approach for measurements of LCR sensor response where a sensor is positioned at a certain distance from a pick up coil. FIG. 6B illustrates one embodiment of the invention, where the LCR sensor also serves as a cantilever and the LCR sensor signal is measured with a pick up coil. A resonant sensor is fabricated wherein an antenna is in conjunction with the sensing film or is embedded in a sensing film. The combination of the sensing film and the antenna provides a flexible substrate with a spring constant in the range from 0.001 to 100 N/m.

The sensing film may be deposited onto the sensor and perform the function of predictably and reproducibly affecting the sensor response upon interaction with the environment. The typical sensor material may include a polymeric, organic, inorganic, biological, composite, or nanocomposite film that changes its property depending on the environment that it is placed in. Additional examples of sensing materials include ionic liquids with organic and inorganic ions, semiconducting nanocrystals, nanotubes, and nanofibers. Examples of properties of a sensing material that are predictably changing upon exposure to the environment include, but are not limited to, changes in capacitance, changes in resistance, changes in thickness, changes in viscoelasticity, or a combination thereof.

For example, capacitance change of a sensing film may be observed when a sensing film is a polyurethane film, is part of the capacitor structure of the LCR resonant sensor, and is exposed to different vapors. For example, polyurethane film has a dielectric constant of 4.8 in air. When the polyurethane film is exposed to toluene, toluene having a dielectric constant of 2.36, the dielectric constant of polyurethane film decreases. When the film is exposed to water, with its dielectric constant of 80, the dielectric constant of polyurethane film increases. These changes in the dielectric constant results in changes in the frequencies $F_p$, $F_1$, and $F_2$.

Other sensing films may show an observable change in resistance when exposed to chemical vapors. For example, when a sensing film is a polyaniline film, its exposure to ammonia causes resistance of the polyaniline film to increase. This change in film resistance results in changes in impedance magnitude $Z_p$, $Z_1$, and $Z_2$.

Changes in thickness of a sensing film may be used in certain embodiments to measure changes in environmental parameters. For example, when a sensing film is a hydrogel, the thickness of the film will change upon exposure to water. A sensing film comprising a hydrogel may include poly(hydroxyalkyl methacrylate), polyacrylamide, polymethacrylamide, poly(N-vinyl-2-pyrrolidone), and poly(vinyl alcohol).

In certain embodiments, changes in viscoelasticity of a sensing film may also be used. Changes in viscoelasticity may be observed when a sensing film, such as is polyisobutylene, acrylonitrile-butadiene copolymer, polychloroprene, and polyepichlorohydrin are exposed to different vapors.

As such the sensing films may be comprised of a variety of materials provided the environmental changes are detectable by changes in the cantilever movement of the sensor or through changes in resonant LCR circuit parameters. Nonlimiting examples of possible sensing film materials are a hydrogel such as poly(2-hydroxyethyl methacrylate), a sulfonated polymer such as Nafion, an adhesive polymer such as silicone adhesive, an inorganic film such as sol-gel film, a biological-containing film such as DNA, antibody, peptide or other biomolecules deposited as a film, a biological-containing film such as DNA, antibody, enzyme, peptide, polysaccharide, protein, aptamer, or other biomolecules or viruses, spores, cells, deposited as a part of a inorganic or polymeric film, a composite film, a nanocomposite film, functionalized carbon nanotube film, film comprised of surface functionalized gold nanoparticles, electrospun polymeric, inorganic, and composite nanofibers, nanoparticles that have one dielectric property and incorporated in a matrix that have another dielectric property.

Composites are materials made from two or more constituent materials with significantly different physical or chemical properties, which remain separate and distinct on a macroscopic level within the finished structure. Nonlimiting examples of composites include carbon black composites with poly(4-vinylphenol), poly(styrene-co-allyl alcohol), poly(vinyl chloride-covinyl acetate), and other materials. Nanocomposites are materials made from two or more constituent materials with significantly different physical or chemical properties, which remain separate and distinct on a nanoscale level within the finished structure. Nonlimiting examples of nanocomposites include: carbon nanotube nanocomposites with polymers (such as poly(N-vinylpyrrolidone), polycarbonate, polystyrene, etc.); semiconducting nanocrystals quantum dots nanocomposites with polymers, metal oxide nanowires, and carbon nanotubes; metal nanoparticles or nanoclusters functionalized with carbon nanotubes.

Further types of materials include aligned nanostructures where alignment is performed by various known methods (dielectrophoretic alignment, alignment during material polymerization, alignment due to spatial confinement, alignment during slow solvent evaporation, and others), self-assembled structures such as colloidal crystal structures of the same size of particles, multilayers of colloidal crystal films where different layers have different size of assembled particles, nanoparticle assemblies where the particles have core-shell structure with the particle core of one dielectric property and particle shell of another dielectric property, bio-inspired materials, zero-dimensional nanomaterials, one-dimensional nanomaterials, two-dimensional nanomaterials, and three-dimensional nanomaterials.

Self-assembled structures include colloidal crystal structures of the same size of particles, multilayers of colloidal crystal films where different layers have different size of assembled particles, nanoparticle assemblies where the particles have core-shell structure with the particle core of one dielectric property and particle shell of another dielectric property. Nonlimiting examples of materials of self-assembled colloidal crystal structures include polystyrene, polymethylmethacrylate, polyvinyltoluene, styrene/butadiene copolymers, styrene/vinyltoluene copolymers, and silica. The typical diameters of these colloidal particles depend on type of material and may range from 50 nanometers to 25 micrometers. Nonlimiting examples of colloidal crystal structures with multiple layers include at least one layer of particles of one size assembled as a colloidal array onto the sensor substrate and at least one layer of particles of another size assembled as a colloidal array on top of the previous layer. Nonlimiting examples of bio-inspired materials include super hydrophobic or superhydrophilic coatings.

Nonlimiting examples of zero-dimensional nanomaterials include metal nanoparticles, semiconducting nanocrystals. Nonlimiting examples of one-dimensional nanomaterials include nanotubes, nanowires, nanorods, and nanofibers. Nonlimiting examples of two-dimensional nanomaterials include graphene. Nonlimiting examples of three-dimensional nanomaterials include colloidal spheres.

Nonlimiting examples of nanoparticles that have core-shell structure with the particle core of one dielectric property and particle shell of another dielectric property include: metal (gold, silver, their alloy, etc.) core nanoparticles and organic shell layers of dodecanethiol, decanethiol, 1-butanethiol, 2-ethylhexanethiol, hexanethiol, tert-dodecanethiol, 4-methoxy-toluenethiol, 2-mercaptobenzoxazole, 11-mercapto-1-undecanol, 6-hydroxyhexanethiol; polymeric core (polystyrene, polymethylmethacrylate) and inorganic shell (silica); isolating core (polystyrene, polymethylmethacrylate, silica) and semiconducting shell (carbon nanotubes, TiO2, ZnO, SnO2, WO3), and carbon nanotube core that is decorated with metal nanoparticles.

These diverse sensing materials shown as nonlimiting examples are needed on the sensing region of the LCR resonant sensor because analyte-induced changes in the sensing material film affect the complex impedance of the antenna LCR circuit through the changes in material resistance and capacitance. Such changes provide diversity is response of an individual RFID sensor and provide the opportunity to replace a whole array of conventional sensors with a single LCR or RFID sensor.

In one embodiment, an LCR sensor is configured as a cantilever such that the antenna/sensing film combination is mechanically attached to the assembly resulting in the sensing film having a cantilevered distal end opposite to a supported proximal end. Viscoelastic changes in the sensing film cause displacement of the sensing film relative to the supported proximal end.

In certain embodiments, an antenna is deposited on to a dielectric material substrate such as a polymeric film. A sensing material is then deposited onto the antenna such that the electromagnetic field in the antenna probes the sensing film, as illustrated in FIG. 4. The mechanical attachment of the antenna/sensing film may be a direct attachment to the assembly, as shown in FIG. 6 where the assembly contains is a pick up coil, or it may be through a mechanical support structure contained within the resonant sensor. The mechanical support structure may be an adhesive, an inorganic film layer or an organic film layer. In other embodiments additional points of attachment may be used in areas adjacent to the supported proximal end, provided the distal end of the sensing film is able to deflect.

In operation, the sensing film deposited onto this resonant sensor deflects the sensor and the deflection is measured with a pick up coil. The pick up coil also measures dielectric changes of the sensing film from the measurement of the impedance of the sensor. In certain embodiments, the pick up coil measures sensor response using inductive coupling or capacitive coupling.

In one embodiment, the resonant LCR sensor operates in the range from 50 kHz to 30 GHz, more preferably from 70 kHz to 25 GHz, and more preferably from 100 kHz to 20 GHz. In certain embodiments, the resonant LCR sensor may operate at a specific frequency such as around 125 kHz, 134 kHz, 13.5 MHz, or 915 MHz, or 2.4 GHz.

FIG. 7 shows a representative sensing mechanism where a mechanical sensor response (cantilever bending) is provided from the interactions of analyte (80) with the sensing film of the cantilever surface (90) as described in prior art by Hagleitner et al., Nature 2001, 414, 293-296. There are several approaches for measuring the interaction of analytes with a sensing film on a cantilever including, but not limited to, optical, frequency, piezoresistive, and capacitance readouts.

Figure 8:
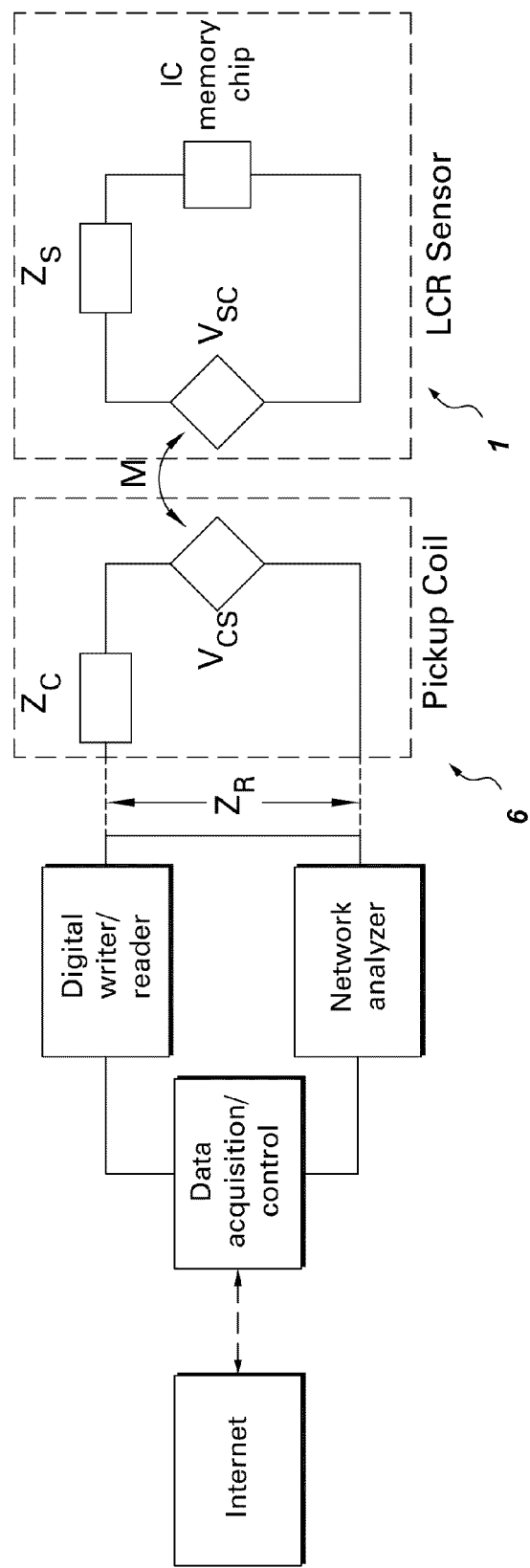
FIG. 8 shows the operation principle, which is applied in the operation of physical, chemical, and biological passive LCR sensors.

As shown in FIG. 8, the operation of an LCR sensor (1) relative to a pick up coil (6) is based on measurements and changes in inductive coupling between the two elements. Reading and writing of digital information into the LCR sensor 1 and measurement of complex impedance of the LCR sensor antenna are performed via mutual inductance coupling between the LCR sensor antenna and the pickup coil 6 coupled to a reader. The interaction between the LCR sensor and the pickup coil can be described using a general mutual inductance coupling circuit model. The model includes an intrinsic impedance of the pickup coil $Z_c$ and an intrinsic impedance of the LCR sensor $Z_s$. The mutual inductance coupling M between the pickup coil and the LCR sensor is represented by two voltage sources $V_{cs}$ and $V_{sc}$. The mutual inductance coupling M and the intrinsic impedances of the pickup coil $Z_c$ and the LCR sensor $Z_s$ are related though the total measured impedance across the terminal of the pickup coil $Z_T$ given by the following equation:

$$Z_T = Z_c + (\omega^2 M^2 Z_S)$$

where $\omega$ is the radian carrier frequency. The equation illustrates the importance of the control of the mutual inductance coupling M for the accurate reading of the LCR sensor response because the measured impedance $Z_T$ is proportional to the square of the mutual inductance coupling M.

According to the present invention, when the LCR sensor is interrogated with a RFID reader/writer device to read the complex impedance, different power levels are applied to perform these measurements in order to control the sensitivity of the sensor and its selectivity. Referring again to FIG. 3, a voltage needs to be applied to activate the chip 34. To activate the chip, an RFID interrogator (reader/writer device) sends an RF signal that is captured by the antenna of the RFID tag creating an AC voltage across the antenna. An on-chip rectifier further converts this AC voltage into a DC voltage that activates the IC chip. The activated chip adds its electronic properties (including but not limited to its capacitance and resistance) to the antenna circuit. Thus, the antenna circuit experiences a resonance peak shift to smaller frequencies, peak magnitude decrease, and peak distortion. These changes affect the sensitivity of the sensor and its selectivity when the sensor is employed for measurements of analytes of different nature.

Because multiple parameters are measured from an individual sensor, the multivariate sensor response provides a significantly orthogonal response to different environmental effects. In particular, this sensor property provides the ability of the sensor to correct for the temperature effects of sensor response. This temperature correction originates from the temperature-induced effects on the resistance and capacitance of the sensing film deposited onto the sensor antenna and the temperature induced effects on the resistance and capacitance of the sensor antenna itself. For sensing applications, the resistance and capacitance of the sensing film is selected to be predictably variable as a function of analyte concentration. The temperature affects the sensing film and sensor antenna with different magnitude of the effects, because of the different materials properties of the antenna and sensing film. Since the sensor yields a multivariable response, temperature effects of the sensor antenna and the sensing material are separated.

Nonlimiting examples of sensing materials that are affected by temperature fluctuations, which may be corrected by the multivariable sensor output, include polymeric materials, organic materials, biological materials, and inorganic materials. The nonlimiting examples of temperature regions for operation of these sensing materials include temperatures below the freezing point of water 0° C., temperatures below 100° C., and temperatures over 100° C. Nonlimiting examples of sensing materials that work at temperatures below 0° C. include siloxanes, polyisobutylene, and others. Nonlimiting examples of their uses at these temperatures are for vapor detection. Nonlimiting examples of sensing materials that work at temperatures below 100° C. include conjugated polymers, carbon nanotubes, titania nanotubes, carbon nanotubes functionalized with conjugated polymers or biological molecules such as DNA, peptides, and others. Nonlimiting examples of their uses at these temperatures are for gas and biological detection in air and water. Nonlimiting examples of sensing materials that work at temperatures above 100° C. include metal oxides, and semiconducting metal oxides, mixed-oxides, titania nanotubes, ionic liquids, and quantum dots. Nonlimiting examples of their uses at these temperatures are for gas detection.

Examples of sensing materials operating above 100° C. also include, but are not limited to, those that have combination of permittivity capacitance and conductivity effects or preferentially capacitance or preferentially conductivity effects. For example, a mixed-oxide composition of $BaTiO_3$ and $La_2O_3$ (1:1 mole ratio) has variable conductivity upon exposure to $CO_2$. A mixed-oxide composition of ZnO and $WO_3$ (1:1 mole ratio) has variable permittivity upon exposure to NO. Permittivity changes of the sensing film are detected by the pronounced changes in sensor capacitance.

Example 1

Passive LCR sensors were used for demonstration of the disclosed sensing method and system; a passive LCR sensor is defined as a sensor, which is battery free. As model analytes, three vapors were employed trichloroethylene (TCE), methanol (MeOH), and toluene (TOL). Vapors detection was performed using a polyurethane (Thermedics Co., Boston, Mass.) film as the sensing film. Polymeric sensing film was applied onto the resonant LCR antenna by a conventional draw-coating process. Measurements of the complex impedance of LCR sensors were performed with a network analyzer (Model E5062A, Agilent Technologies, Inc. Santa Clara, Calif.) under computer control. The network analyzer was used to scan the frequencies over the range of interest and to collect the complex impedance response from the LCR sensors. For gas sensing, generation of different concentrations of vapors was done using an in-house built computer-controlled vapor-generation system. Collected complex impedance data was analyzed using KaleidaGraph (Synergy Software, Reading, Pa.) and PLS_Toolbox (Eigenvector Research, Inc., Manson, Wash.) operated with Matlab (The Mathworks Inc., Natick, Mass.).

The selectivity of LCR sensors was evaluated using principal components analysis (PCA). The amount of variance in data captured by individual principal components (PCs) was indicative of sensor selectivity. Upon performing the PCA, selectivity descriptors can be determined for measured vapors. The selectivity descriptor was represented as a vector in PCA space. This vector was described by a unique combination of the respective scores of principal components. The selectivity descriptors from sensor responses to each vapor were considered as clusters in the PCA space. Each cluster S was represented by its mean and standard deviation with respect to k-th principal component. The Euclidean distance E between two clusters of selectivity descriptors can be calculated as:

$$E_{ij} = \left\{ \sum_1^n W_k (S_{ki} - S_{kj})^2 \right\}^{1/2}$$

where i and j are indices of clusters $S_i$ and $S_j$, respectively, $E_{ij}$ is the Euclidean distance between these clusters, $W_k$ is the weighting factor (equal to captured percent variance) of the k-th principal component and n is the number of principal components used for multivariate analysis.

From a variety of available approaches for cluster analysis, analysis of Euclidean distances was selected because it provides the information about both the distance between clusters and the spread of each cluster. Further, although it is possible to perform calculations of Euclidean distances on raw data, PCA can be performed first, to reduce the noise in the data.

Figure 9B:
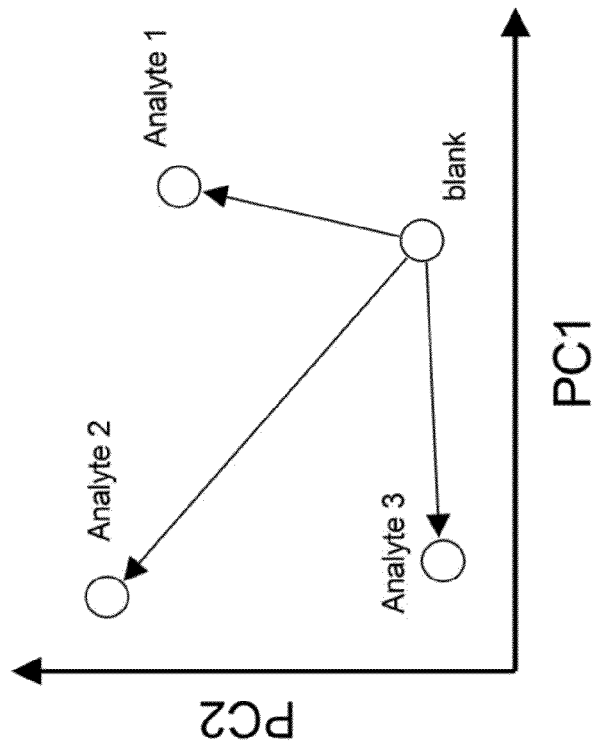
FIG. 9 is an example demonstrating improvement in sensor selectivity.
Figure 9A:
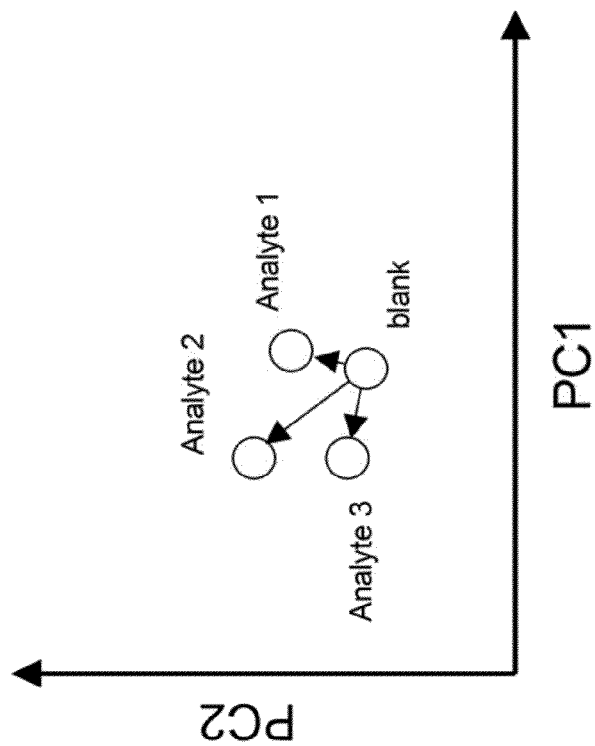
Figure 10A:
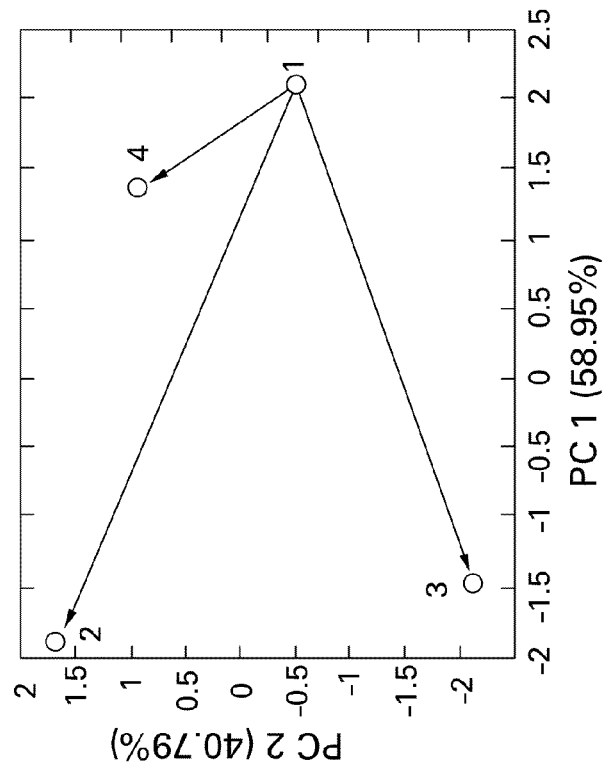
FIG. 10 shows the results of PCA analysis of LCR sensor response using a conventional readout compared to a cantilever-response sensor.
Figure 10B:
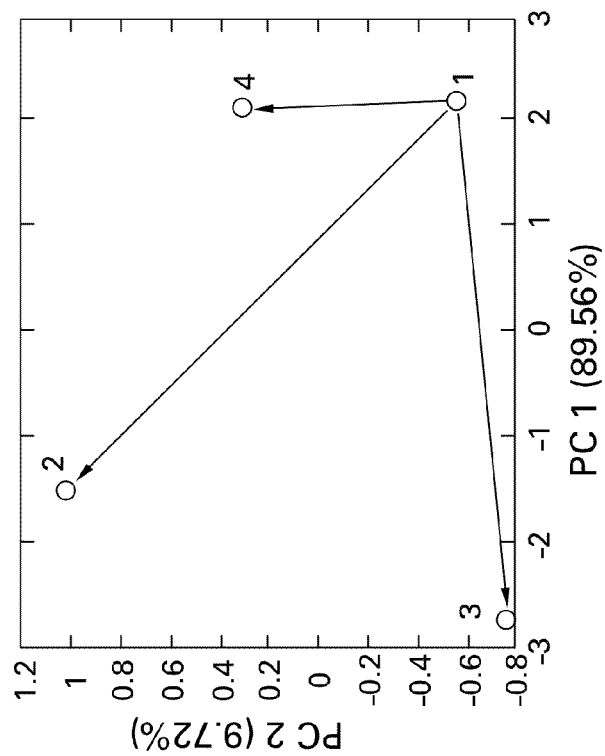
Figure 11:
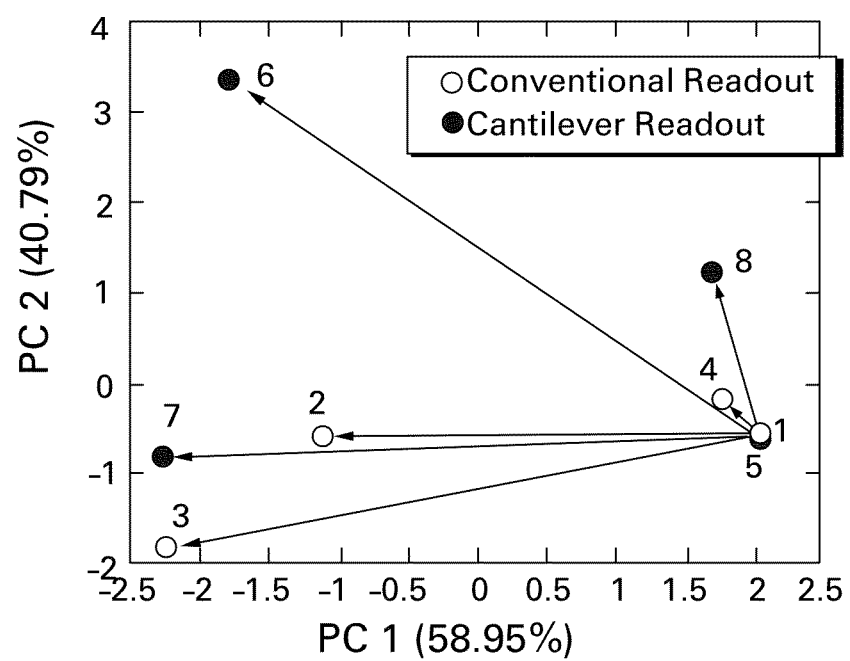
FIG. 11 is an illustration of a single PCA plot that combines two types of readout from an LCR sensor.

FIG. 9 demonstrates an example of such determination of improvement of sensor selectivity. A PCA response of a sensor to three analytes and a blank is compared using a conventional LCR sensor readout (FIG. 9A) and a cantilever-based readout of this invention (FIG. 9B). The distance between the blank and vapors 1, 2, and 3 quantifies the amount of sensor selectivity. The use of multivariate analysis on experimental data showed that the combined independent effects of resistance and capacitance contributions of the sensing film lead to the to the vapor-induced resonance response of the LCR sensor antenna circuit with high variance captured by PC1 and PC2. The magnitude of PC2 using a conventional readout of the LCR sensor was 10%. The magnitude of PC2 using a cantilever readout of the LCR sensor was 40%. Results of PCA analysis of LCR sensor response using a conventional readout and using cantilever-response sensor are compared in FIG. 10. A single PCA plot that combines two types of readout from the LCR sensor is illustrated in FIG. 11.

Example 2

Figure 12:
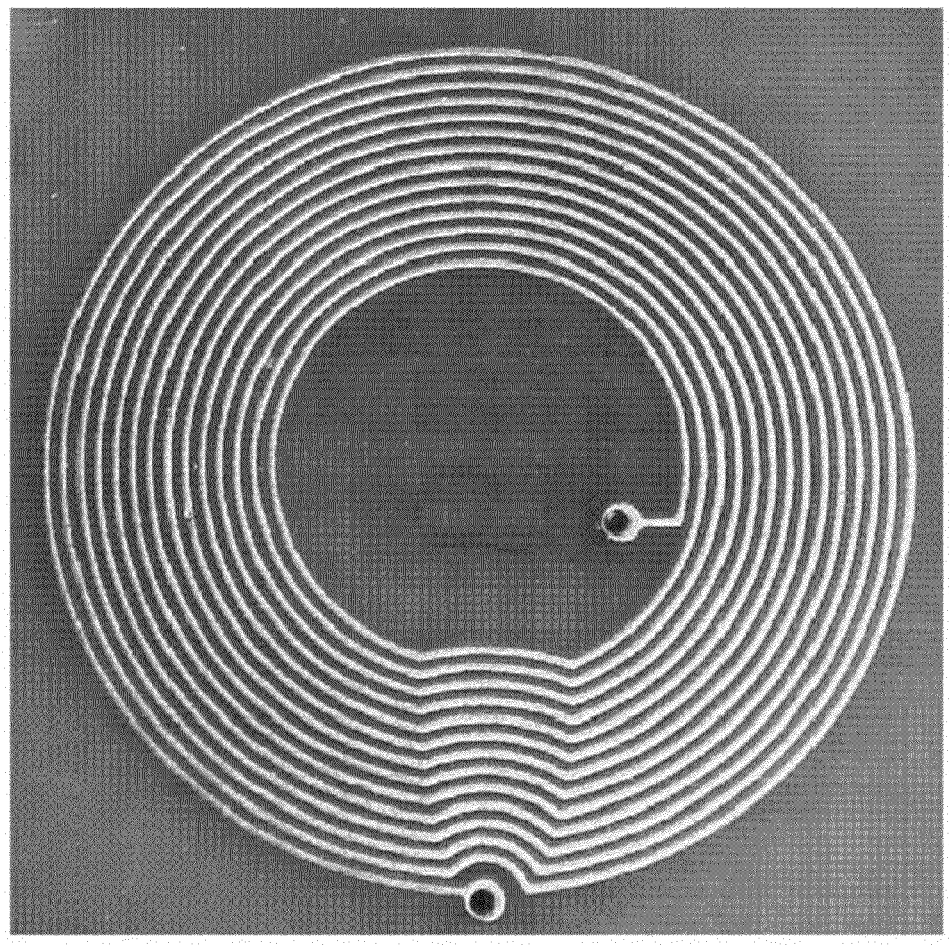
FIG. 12 illustrate one embodiment of an LCR sensor for selective chemical sensing with a MB89R118A memory chip (Fujitsu Corp., Japan) operating at a nominal frequency of 13.56 MHz.

Passive LCR sensors were used for demonstration of the disclosed sensing method and system. As model analytes, three vapors were employed such as water, methanol (MeOH), and ethanol (EtOH). Vapors detection was performed using a Nafion polymer (Aldrich, Milwaukee, Wis.) film as the sensing film. Polymeric sensing film was applied onto the resonant LCR antenna by a conventional draw-coating process. The LCR sensor is shown in FIG. 12 and contains a MB89R118A memory chip (Fujitsu Corp., Japan) operating at a nominal frequency of 13.56 MHz. Measurements of the complex impedance of LCR sensor were performed with a network analyzer (Model 8751A, Hewlett Packard, Inc. Santa Clara, Calif.) under computer control at several power settings. The network analyzer was used to scan the frequencies over the range of interest and to collect the complex impedance response from the LCR sensors. For gas sensing, generation of different concentrations of vapors was done using an in-house built computer-controlled vapor-generation system. Collected complex impedance data was analyzed using KaleidaGraph (Synergy Software, Reading, Pa.) and PLS_Toolbox (Eigenvector Research, Inc., Manson, Wash.) operated with Matlab (The Mathworks Inc., Natick, Mass.).

FIG. 13 illustrates the $Z_p$ response of the sensor at two powers of +15 dBm and −15 dBm. This data illustrates that by varying the power, the sensitivity of the response was modified and the selectivity of the response was modified as well as summarized in Table 1. FIG. 14 illustrates $F_p$ response of LCR sensor at two interrogation powers of +15 dBm and −15 dBm upon measurements of water, methanol, and ethanol vapors. Although not as pronounced as for $Z_p$ response, the selectivity and selectivity patterns of the $F_p$ response have been modified upon sensor interrogation at two powers of +15 dBm and −15 dBm.

TABLE 1

Effects of interrogation power on the sensitivity and selectivity of the vapor response.

| Parameter | Power level +15 dBm | Power level −15 dBm |
|---|---|---|
| Relative water vapor response (24 part-per-thousand H2O vapor) to the initial sensor signal | 35% | 51% |
| Relative methanol vapor response (115 part-per-thousand methanol vapor) to the initial sensor signal | 8.9% | 20.9% |
| Methanol/water response ratio | 0.25 | 0.41 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An inductor-capacitor-resistor (LCR) assembly for simultaneous sensing of two or more environmental parameters of a sample comprising:
    an LCR resonator sensor wherein the sensor comprises:
        an antenna said antenna comprising a sensing region;
        a sensing film deposited onto the sensing region;

an attachment point for mechanically attaching the LCR resonator sensor to the assembly;

a pick up coil in operative association with the LCR resonator sensor; and wherein said antenna and said pick up coil are coupled by mutual inductance and connected to a reader; and wherein viscoelastic changes in the sensing film cause displacement of the antenna relative to the pick up coil; wherein said mutual inductance improves selectivity of the LCR resonator sensor and quantifies said two or more environmental parameters.

2. The assembly of claim 1 wherein the LCR sensor further comprising an IC memory chip.

3. The assembly of claim 1 wherein the attachment point results in the sensing film having a cantilevered distal end opposite to a supported proximal end.

4. The assembly of claim 3 further comprising at least one additional point of attachment adjacent to the supported proximal end.

5. The assembly of claim 1 wherein the sensing film comprises a polymer, an organic material, an inorganic material, a biological material, a nanomaterial, a nanocomposite material, a colloidal crystal material or a combination thereof.

6. The assembly of claim 5 wherein the biological material is a DNA, an antibody, a peptide, a protein, an enzyme, a polysaccharide, an aptamer, a virus, a spore, a cell or a combination thereof.

7. The assembly of claim 5 wherein the nanocomposite material comprises nanoparticles incorporated into a matrix and wherein said nanoparticles have at least one dielectric property different than a dielectric property of the matrix.

8. The assembly of claim 7 wherein the nanocomposite material comprises nanomaterials having an aligned nanostructure and wherein said aligned nanostructure is from self assembly, dielectrophoretic alignment, material polymerization, spatial confinement, solvent evaporation, or combinations thereof.

9. The assembly of claim 8 wherein the nanocomposite material comprises nanoparticles having a core-shell structure and wherein the dielectric properties of the core structure and the shell structure are different.

10. The assembly of claim 5 wherein the colloidal crystal material is arranged in layers such that the colloidal crystal structure of each layer has a different uniform particle size.

11. The assembly of claim 1 wherein the sensing film comprises a zero-dimensional nanomaterial, a one-dimensional nanomaterial, a two-dimensional nanomaterial, a three-dimensional nanomaterial or a combination thereof.

12. The assembly of claim 1 wherein the LCR resonator sensor is configured to sense two or more conditions of the sample, said conditions comprising physical, chemical, and biological properties of the sample.

13. A method for measuring two or more environmental conditions of a sample comprising:

providing an LCR assembly according to claim 1;

transmitting an electromagnetic signal from the LCR resonator sensor;

sensing the LCR resonator sensor signal with the pick-up coil; and reading the LCR resonator sensor signal using a reader/writer device coupled to the pick-up coil.

14. The method of claim 13 wherein the sensing step comprises calculating dielectric changes of the sensing film from the measurements of the impedance spectrum of said sensing film.

15. The method of claim 14 wherein the calculating dielectric changes of the sensing film using multivariate analysis.

16. The method of claim 13 wherein the two or more conditions comprises measurements of physical, chemical, and biological properties of the sample.

17. A method for measuring two or more conditions of an environment comprising of a sample:

providing an LCR assembly wherein the LCR assembly comprises:

an LCR resonator sensor wherein the sensor comprises:

an antenna said antenna comprising a sensing region;

a sensing film deposited onto the sensing region; and an IC memory chip attached to the antenna; and a pick up coil in operative association with the LCR resonator sensor such that displacement of the antenna relative to the pick up coil is coupled by mutual inductance to improve selectivity of the LCR resonator;

applying different input power levels to the IC memory chip; and measuring complex impedance spectrum of the sensing antenna at the different input power levels wherein changes in the complex impedance spectrum at the different power levels relate to different physical or biological properties of the sample.

18. The method of claim 17 wherein applying different input power levels to the IC memory chip comprises applying a relatively high power levels to substantially activate the IC memory chip to its different states and applying a relatively low power levels to the IC memory chip to substantially not activate the IC memory chip.

19. A method of correcting for at least one noise parameter of an LCR resonant sensor response comprising the steps of:

providing an LCR assembly wherein the LCR assembly comprises:

an LCR resonator sensor wherein the sensor comprises:

an antenna said antenna comprising a sensing region;

a sensing film deposited onto the sensing region; and a pick up coil in operative association with the LCR resonator sensor such that displacement of the antenna relative to the pick up coil is coupled by mutual inductance to improve selectivity of the LCR resonator;

measuring the complex impedance of the LCR resonator sensor upon exposure to an environmental condition; and correcting for the noise parameters using inputs of the LCR sensor.

20. The method of claim 19 wherein the inputs of the LCR sensor comprise an impedance spectrum, real part of the impedance spectrum, imaginary part of the impedance spectrum, S-parameters, Y-parameters, Z-parameters or a combination thereof.

21. The method of claim 19 wherein the correction step uses multivariate analysis of inputs of the LCR sensor.

22. The method of claim 19 wherein the noise parameters include at least one of ambient temperature, proximity of the LCR resonator sensor to metals, surface contamination of the LCR resonator sensor, and surface contamination of the pick up coil.

* * * * *